United States Patent
Xie et al.

(10) Patent No.: US 12,481,072 B2
(45) Date of Patent: Nov. 25, 2025

(54) SATELLITE MULTIPATH SIGNAL IDENTIFICATION METHOD BASED ON TEMPORALITY AND SPATIAL INTERACTION

(71) Applicant: GUANGDONG UNIVERSITY OF TECHNOLOGY, Guangzhou (CN)

(72) Inventors: Kan Xie, Guangzhou (CN); Zhenni Li, Guangzhou (CN); Shengli Xie, Guangzhou (CN); Ci Chen, Guangzhou (CN); Victor Fedorovich Kuzin, Guangzhou (CN); Kungan Zeng, Guangzhou (CN); Bo Li, Guangzhou (CN)

(73) Assignee: Guangdong University of Technology, Guangzhou (CN)

( * ) Notice: Subject to any disclaimer, the term of this patent is extended or adjusted under 35 U.S.C. 154(b) by 330 days.

(21) Appl. No.: 18/305,784

(22) Filed: Apr. 24, 2023

(65) Prior Publication Data

US 2024/0219578 A1 Jul. 4, 2024

(30) Foreign Application Priority Data

Jan. 4, 2023 (CN) .......................... 202310005077.7

(51) Int. Cl.
 *G01S 19/22* (2010.01)
 *G01S 19/37* (2010.01)
(52) U.S. Cl.
 CPC ............. *G01S 19/22* (2013.01); *G01S 19/37* (2013.01)
(58) Field of Classification Search
 CPC .................................. G01S 19/22; G01S 19/37

(Continued)

(56) References Cited

U.S. PATENT DOCUMENTS

2020/0132861 A1 * 4/2020 Kim .................. G01S 19/50

FOREIGN PATENT DOCUMENTS

| CN | 114201988 A | | 3/2022 | |
|---|---|---|---|---|
| JP | 2023159941 A | * | 11/2023 | ............. H04B 7/024 |
| WO | WO-2022229018 A1 | * | 11/2022 | ......... H04B 17/0087 |

OTHER PUBLICATIONS

The State Intellectual Property Office of People's Republic of China, First Office Action, Jun. 9, 2023, 7 pages.

(Continued)

*Primary Examiner* — Harry K Liu
(74) *Attorney, Agent, or Firm* — Heslin Rothenberg Farley and Mesiti P.C.; Victor A. Cardona, Esq.

(57) ABSTRACT

The present disclosure provides a satellite multipath signal identification method based on temporality and spatial interaction. The method includes: acquiring satellite data, and dividing the satellite data into a time series dataset and a multi-satellite input dataset; building a multipath signal identification model, and inputting the time series dataset and the multi-satellite input dataset into the multipath signal identification model, where the multipath signal identification model includes a long short-term memory (LSTM) network, a transformer block, and a fully connected network; performing, by the LSTM network, feature extraction on the time series dataset to acquire a time series feature; performing, by the transformer block, feature extraction on the multi-satellite input dataset to acquire an environmental characterization; and fusing, by the fully connected network, the time series feature and the environmental characterization to acquire a multipath signal identification result.

7 Claims, 5 Drawing Sheets

(58) Field of Classification Search
USPC .................................................. 342/357.61
See application file for complete search history.

(56) References Cited

OTHER PUBLICATIONS

The State Intellectual Property Office of People's Republic of China, Second Office Action, Jul. 30, 2023, 7 pages.

* cited by examiner

SATELLITE MULTIPATH SIGNAL IDENTIFICATION METHOD BASED ON TEMPORALITY AND SPATIAL INTERACTION

CROSS REFERENCE TO RELATED APPLICATION

This patent application claims the benefit and priority of Chinese Patent Application No. 202310005077.7, filed with the China National Intellectual Property Administration on Jan. 4, 2023, the disclosure of which is incorporated by reference herein in its entirety as part of the present application.

TECHNICAL FIELD

The present disclosure relates to the field of signal identification, and in particular to a satellite multipath signal identification method based on temporality and spatial interaction.

BACKGROUND

Global navigation satellite system (GNSS) is the most widely used positioning technology, but GNSS signals are vulnerable to environmental interference in the complex urban canyon environment, including urban overpasses. The multipath effect is the key factor that leads to inaccurate positioning of GNSS in urban canyons. At present, the methods to deal with the multipath effect include hardware- and software-based methods. The hardware-based methods include anti-multipath antenna, and high-performance receiver hardware, etc. The hardware-based methods cannot significantly suppress the multipath effect, and their application scenes are limited due to the need for hardware modification. The software-based methods include the sidereal filtering method, the multipath semispherical mapping method, etc. The software-based methods are unstable and involve a huge amount of computation, making them hard to meet the needs of high-precision and rapid positioning. In recent years, due to the rapid development of artificial intelligence (AI) technology, AI methods have been applied to multipath signal identification. However, most of the relevant research is still in the preliminary stage, and the trained model has problems of poor generalization performance and low accuracy of multipath signal identification, making the AI methods fail to meet the requirements for practical application.

SUMMARY

In order to solve the above technical problems, an objective of the present disclosure is to provide a satellite multipath signal identification method based on temporality and spatial interaction. The present disclosure can improve the identification accuracy and generalization performance of a multipath signal identification model in complex urban scenes.

A first technical solution adopted by the present disclosure is as follows: a satellite multipath signal identification method based on temporality and spatial interaction includes the following steps:

acquiring satellite data, and dividing the satellite data into a time series dataset and a multi-satellite input dataset;

building a multipath signal identification model, and inputting the time series dataset and the multi-satellite input dataset into the multipath signal identification model;

where, the multipath signal identification model includes a long short-term memory (LSTM) network, a transformer block, and a fully connected network;

performing, by the LSTM network, feature extraction on the time series dataset to acquire a time series feature;

performing, by the transformer block, feature extraction on the multi-satellite input dataset to acquire an environmental characterization; and fusing, by the fully connected network, the time series feature and the environmental characterization to acquire a multipath signal identification result.

Further, the acquiring satellite data, and dividing the satellite data into a time series dataset and a multi-satellite input dataset specifically includes:

acquiring the satellite data;

standardizing the satellite data to acquire standardized data;

temporally processing, according to a time step, the standardized data to acquire the time series dataset; and filling and truncating, according to a preset threshold, the standardized data to acquire the multi-satellite input dataset.

Through this optimization step, the acquired data is divided into two forms as the input into the model built in this solution. For the acquired satellite feature data, the values of different features differ greatly in order of magnitude. If the acquired satellite feature data is directly input into the model for training, it will lead to slow convergence of the model and even make the model unable to work. Therefore, it is necessary to standardize each feature separately.

Further, the performing, by the LSTM network, feature extraction on the time series dataset to acquire a time series feature specifically includes:

inputting the time series dataset into the LSTM network;

removing, by a forget gate, invalid information at a historical time in the time series dataset to acquire a valid time series feature of a satellite;

updating, by an input gate, the valid time series feature of the satellite to acquire processed state information;

encoding, by an output gate, the processed state information to acquire a fixed time series; and cyclically updating, according to a length of the time series, the time series to acquire the time series feature.

Through this optimization step, the features of the time series information are extracted by the LSTM network so as to fully mine the time-varying trend of the target satellite, and acquire the features conducive to multipath signal identification through the input, forget and output operations.

Further, the performing, by the transformer block, feature extraction on the multi-satellite input dataset to acquire an environmental characterization specifically includes:

inputting the multi-satellite input dataset into the transformer block;

processing, according to a multi-satellite feature relationship, the multi-satellite input dataset to acquire a multi-satellite interaction feature; and subjecting the multi-satellite interaction feature to global average pooling (GAP) to acquire the environmental characterization.

Through this optimization step, the transformer block is used as an extractor of the spatial satellite group data, and the potential characterization between the spatial satellite group data is focused through a multi-head self-attention (MHSA) mechanism, so as to acquire the interactive information in the environment.

Further, the fusing, by the fully connected network, the time series feature and the environmental characterization to acquire a multipath signal identification result specifically includes:

inputting the time series feature and the environmental characterization into a fully connected layer;

merging the time series feature and the environmental characterization in respective last dimension to acquire a fused feature;

subjecting the fused feature to deep fusion through space projection to acquire a deep feature; and acquiring the multipath signal identification result based on the deep feature.

Further, the building a multipath signal identification model, and inputting the time series dataset and the multi-satellite input dataset into the multipath signal identification model includes:

training the multipath signal identification model.

Further, the method includes:

subjecting the multi-satellite interaction feature to residual connection and layer normalization.

Through this optimization step, the generalization ability of the network is enhanced.

Further, the training the multipath signal identification model specifically includes:

acquiring training data;

determining a hyper-parameter in the multipath signal identification model, and setting an adaptive time estimation (Adam) optimizer, a binary cross-entropy loss function, and a total number of training epochs; and training, based on the training data, the multipath signal identification model to acquire a trained multipath signal identification model.

The present disclosure has the following beneficial effects. The present disclosure builds the LSTM network and the transformer block applied to the time series dataset of the target satellite and the multi-satellite input dataset respectively, fully taking into account the time variability of satellite features and the correlation between the spatial satellites. The present disclosure promotes multipath signal identification through the interactive fusion of the time series feature and the environmental characterization, thereby improving the identification accuracy and generalization performance of the multipath signal identification model in complex urban scenes.

DETAILED DESCRIPTION OF THE EMBODIMENTS

The present disclosure will be further described below in conjunction with the drawings and specific embodiments. The step number in the following embodiments is only for the convenience of explanation. The present disclosure does not limit the sequence between steps, and the execution sequence of each step in the embodiment can be adjusted adaptively according to the understanding of those skilled in the art.

Figure 1:
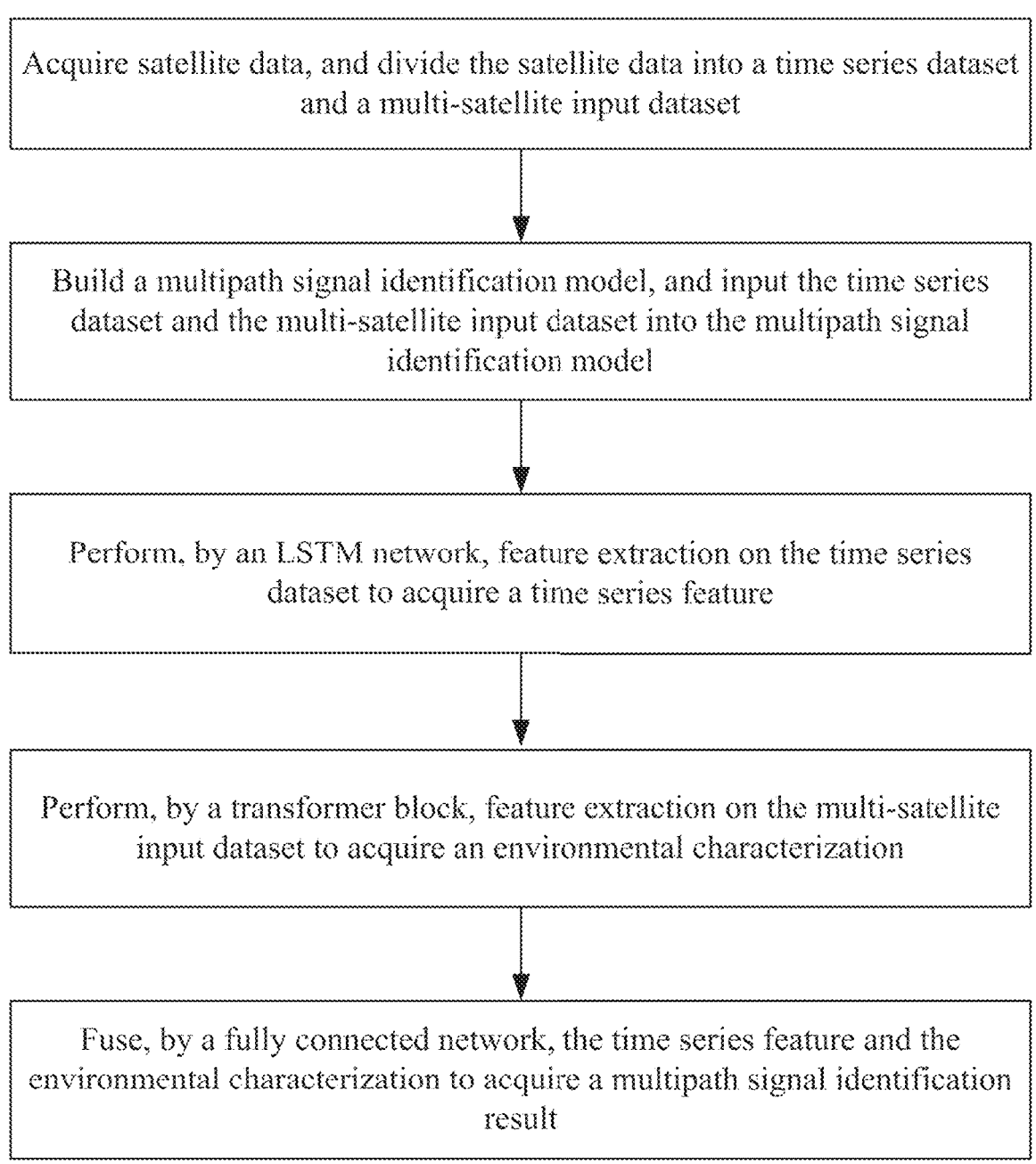
FIG. 1 is a flowchart of a satellite multipath signal identification method based on temporality and spatial interaction according to the present disclosure.

As shown in FIG. 1, the present disclosure provides a satellite multipath signal identification method based on temporality and spatial interaction, including the following steps.

S1. Satellite data are acquired and divided into a time series dataset and a multi-satellite input dataset.

S1.1 In the present disclosure, a multipath signal of a Beidou satellite is identified. First, five features of the satellite signal sent by a BeiDou Navigation Satellite System (BDS) are acquired through a BeiDou information acquisition module (such as TD1050 chip of Techtotop). The acquired features include azimuth angle (Az), angle of altitude (Aoe), carrier to noise ratio (CNR), pseudo-range (Pr) and root-sum squares of pseudo-range residuals (Rrs).

For the acquired satellite feature data, the values of different features differ greatly in order of magnitude. If the acquired satellite feature data is directly input into the model for training, it will lead to slow convergence of the model and even make the model unable to work. Therefore, it is necessary to standardize each feature separately. Each feature data is converted into a distribution with a mean value of 0 and a standard deviation of 1. The standardization equation is as follows:

$$\tilde{x} = \frac{x - \mu}{\sigma}$$

In the above equation, x denotes the satellite data before conversion, x̃ denotes the satellite data after conversion, μ denotes the mean value, and σ denotes a variance.

After the feature data is acquired, it is divided into two forms according to its space-time distribution: 1) form-I: satellite time series data; and 2) form-II: spatial satellite group data. These two data forms are described below.

Target-Satellite Time Series Data Processing:

For the time series data, $MOA \in \mathbb{R}^{5 \times p}$ denotes a set of data. In order to unify the input length, the length of a time window is denoted as p. Therefore, the input form of the target time series at time t is:

$$MOA = \begin{bmatrix} Az_{t-p} & Az_{t-p+1} & \ldots & Az_t \\ Aoe_{t-p} & Aoe_{t-p+1} & \ldots & Aoe_t \\ CNR_{t-p} & CNR_{t-p+1} & \ldots & CNR_t \\ Pr_{t-p} & Pr_{t-p+1} & \ldots & Pr_t \\ Rrs_{t-p} & Rrs_{t-p+1} & \ldots & Rrs_t \end{bmatrix}$$

Each time series input corresponds to a multipath label of a target satellite at a current time. If the satellite signal at the time is a multipath signal, the label is 1, otherwise, the label is 0. According to the time step, the acquired dataset is temporally processed to acquire an input into an LSTM network.

Spatial Satellite Group Data Processing:

The five features of n satellites (n>4) at the current time are extracted as the input data into a transformer model to learn a multi-satellite relationship and acquire the characterization thereof in a surrounding environment, that is, the correlation data of the spatial satellite group. $MOB \in \mathbb{R}^{n \times 5}$ denotes the spatial satellite group data, and the input at the time t is expressed as:

$$MOB = \begin{bmatrix} Az_t^1 & Aoe_t^1 & CNR_t^1 & Pr_t^1 & Rrs_t^1 \\ Az_t^2 & Aoe_t^2 & CNR_t^2 & Pr_t^2 & Rrs_t^2 \\ \vdots & \vdots & \vdots & \vdots & \vdots \\ Az_t^n & Aoe_t^n & CNR_t^n & Pr_t^n & Rrs_t^n \end{bmatrix}$$

In addition, the number n of the spatial satellites needs to be given a maximum value because the shape of the data input into the model for training is consistent. In the present disclosure, n is defined as $4 \leq n \leq M$. When the number of the spatial satellites is less than 4, the data in this form is zero-filled. When the number of the spatial satellites is greater than M, the data in this form is truncated to ensure that the shape of the input data in this form is M×5.

S2. A multipath signal identification model is built, and the time series dataset and the multi-satellite input dataset is input into the multipath signal identification model. The multipath signal identification model includes a long short-term memory (LSTM) network, a transformer block, and a fully connected network.

Figure 2:
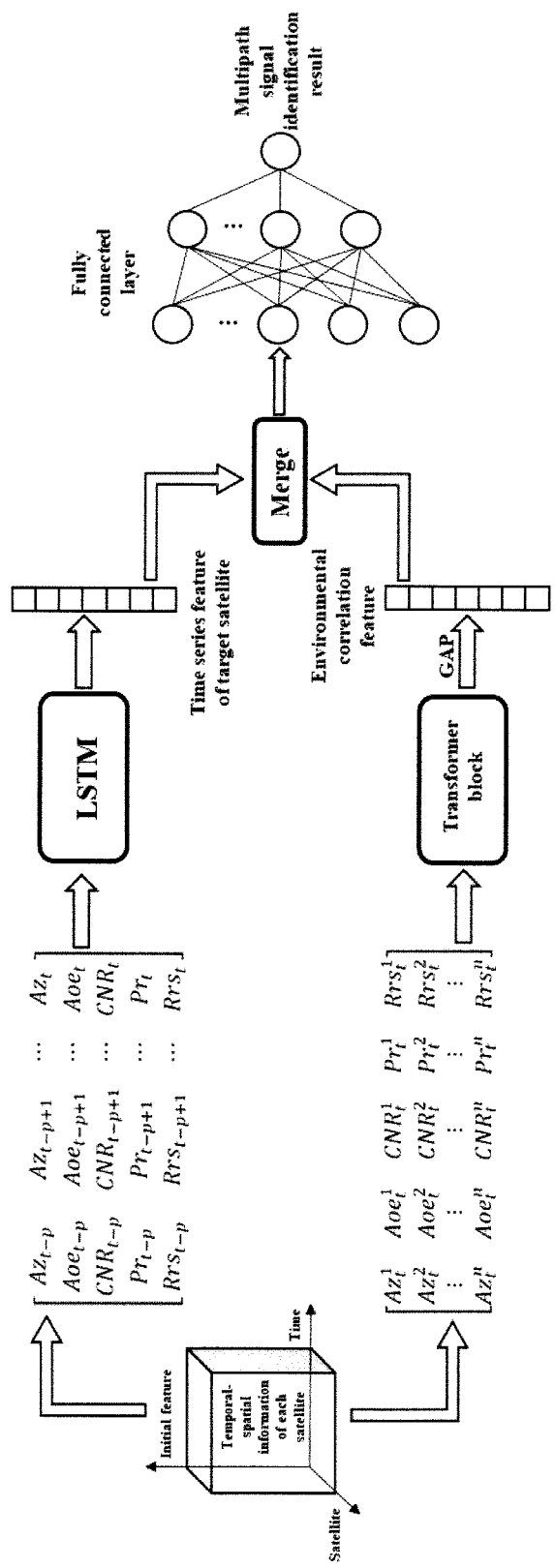
FIG. 2 is a schematic diagram of data processing according to a specific embodiment of the present disclosure.

In this step, a deep neural network is constructed through the LSTM network and the transformer block for multipath signal identification. The overall framework of the network is shown in FIG. 2. The time series dataset (form-I) and the multi-satellite input dataset (form-II) acquired in step S1 are input into the LSTM network and the transformer block respectively to extract the space-time features of the satellites. The time series feature of the satellite and the correlation characterization of the satellites in the environment are acquired, and these two types of features are merged and input into a fully connected network for further fusion, so as to acquire a multipath signal identification result.

S2.1 By the LSTM network, feature extraction is performed on the time series dataset to acquire a time series feature.

The LSTM network is a special form of recurrent neural network (RNN), which can effectively process long temporal data and acquire long-range data information. Therefore, the LSTM network has great advantages in processing long-time series information. In order to overcome the problem of time-varying interference faced by the multipath signal, the present disclosure extracts the time series feature through the LSTM network, fully mines the time-varying trend of the target satellite, and acquires features conducive to multipath signal identification through input, forget and output operations.

Figure 3:
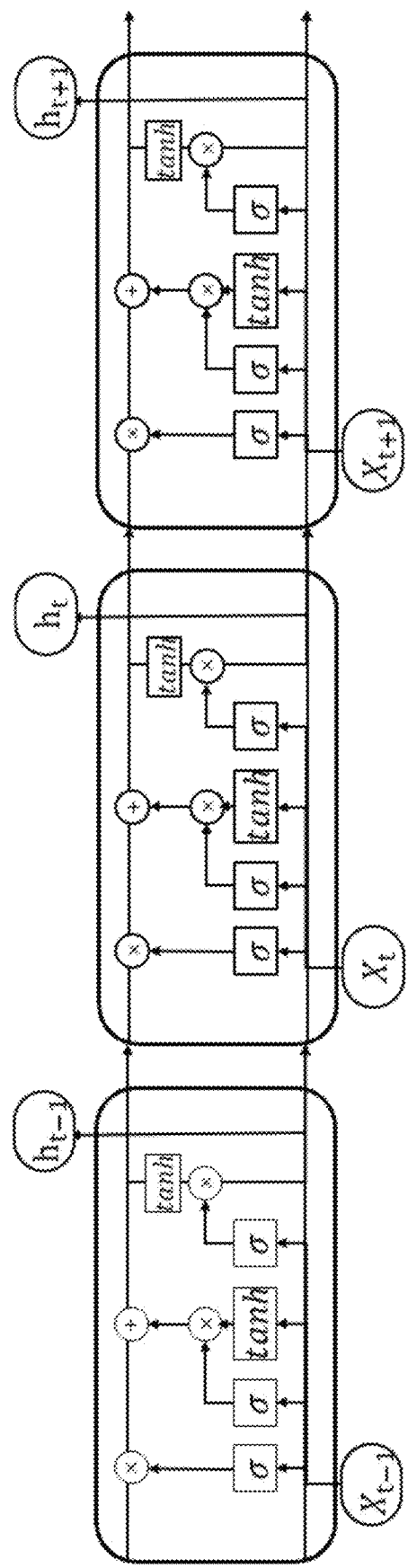
FIG. 3 is a schematic diagram of an LSTM network according to a specific embodiment of the present disclosure.

The structure of the LSTM network is shown in FIG. 3. The processing flow of the LSTM network for a time series sample is described below.

S2.1.1 Standardized form-I satellite data MOA is input into the LSTM network. A forget gate is configured to remove some invalid information at a historical time of the time series sample. Specifically, a sigmoid function is configured to determine how much of output information $h_{t-1}$ and how much of cell state $C_{t-1}$ at a previous time can be preserved in a current cell state $C_t$. The calculation equation is as follows:

$$f_t = \sigma(W_f \cdot g[h_{t-1}, x_t] + b_f)$$

σ denotes the sigmoid function, $W_f$ denotes a weight matrix, $b_f$ denotes a bias, $x_t$ denotes a current input into the network, and g denotes vector merging.

S2.1.2 A valid time series feature processed by the forget gate is updated through an input gate. A product of information processed by the sigmoid function and information processed by a tanh function denotes information of the current input $x_t$ to be passed to the current cell state $C_t$. The calculation equation of the input gate is as follows:

$$i_t = \sigma(W_i \cdot g[h_{t-1}, x_1] + b_i) \cdot \tanh(W_c \cdot g[h_{t-1}, x_t] + b_c)$$

S2.1.3 The processed state information is encoded into a fixed time series output through the output gate. Similarly, the product of the information processed by the sigmoid sigmoid function and the information processed by the tanh function determines the information to be passed from the current cell state to the output $h_t$ at the current time. The calculation equation is as follows:

$$h_t = \sigma(W_0 \cdot g[h_{t-1}, x_t] + b_0) \cdot \tanh(C_t)$$

S2.1.4 Cyclic update is performed according to the length of the time series. The three steps of the forget gate, the input gate, and the output gate are executed cyclically to acquire the final output of the LSTM network. Because the LSTM network has a powerful long-term memory function, the information output in the current state includes the information at the historical time. Therefore, the information output by the LSTM network at a last time is taken as the time series feature of the target satellite, denoted as $HID \in \mathbb{R}^{n \times l_1}$, $l_1$ being a number of neurons in a hidden layer.

S2.2 By the transformer block, feature extraction is performed on the multi-satellite input dataset to acquire an environmental characterization.

The transformer model is a new and effective model in the field of natural language processing, and it has strong advantages in processing temporal data. Compared with the traditional RNN, the transformer model has a strong parallel processing capability and high training speed and reasoning speed. The model uses a large number of multi-head self-attention (MHSA) mechanism as the main part of each block, and can effectively notice the correlation between each position feature, so as to better learn the feature. In order to overcome the problem of regional interference faced by the multipath signal, the present disclosure uses the transformer block as the feature extractor of the spatial satellite group data, and focuses on the potential characterization between the spatial satellites through the MHSA mechanism, so as to acquire the interactive information in the environment. The relationship between different satellites at the same time does not involve the relationship between input time series, so the introduction of a temporal relationship will make it impossible to fully reflect the environmental situation. In order to avoid over-learning of the temporal mode, the present disclosure removes a position encoder and a word embedding layer in an original transformer framework to acquire a transformer structure shown in FIG. 4. The transformer block is configured to extract the environmental correlation feature from the spatial satellite group data, as described below.

S2.2.1 The form-II data MOB is input into a MHSA mechanism layer after standardization. The MHSA mechanism layer is built on a self-attention (SA) mechanism layer. The equation of the SA mechanism is as follows:

$$\text{Attention}(Q, K, V) = \text{softmax}\left(\frac{QK}{\sqrt{d_k}}\right)V$$

$Q=W^Q X$, $K=W^K X$, and $V=W^V X$. X denotes the feature information of multiple satellites at a certain time; Q, K, and V denote projections of X in different directions, respectively. softmax is a nonlinear activation function. It processes an inner product of Q and K to acquire a correlation fraction matrix between each satellite feature. The inner product of the result and V is acquired, so as to acquire an attention map between each satellite feature. $\sqrt{d_k}$ denotes a scaling factor. When the length of the time series is large, the inner product of Q and K is scaled to smooth the output of softmax, so as to acquire a more appropriate fraction matrix.

In order to focus on the relationship between each satellite feature from different perspectives, multiple SA mechanism sub-networks are combined to form an MHSA layer, as shown in FIG. 3. Specifically, first, the number h of heads in the MHSA layer is determined, and the lengths of Q, K, and V are set as m. Before calculating by the SA mechanism, Q, K, and V are projected into a low-dimensional space of m/h. Such dimensionality reduction projection is performed h times. The calculation of the SA mechanism is performed separately, and the results are merged. Finally, the output of the MHSA mechanism layer is acquired through a linear projection sub-layer.

In order to enhance the generalization ability of the network, residual connection and layer normalization are also performed on the acquired result.

Figure 4:
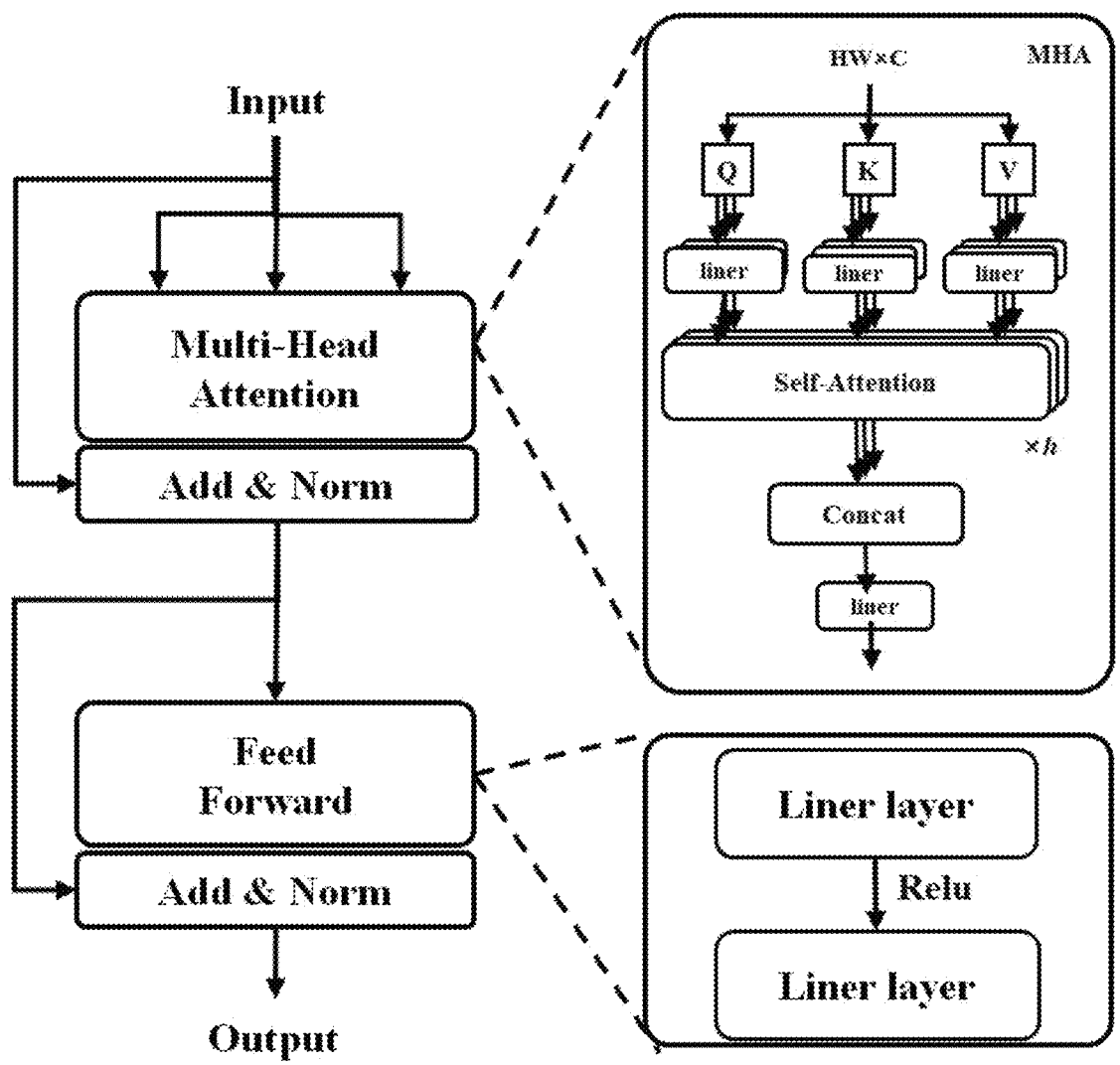
FIG. 4 is a schematic diagram of a transformer block according to a specific embodiment of the present disclosure.

S2.2.2 The above operations are linear temporal projection and matrix transformation. After acquiring the interaction features between the multiple satellites that are concerned by the MHSA layer, it is necessary to add some nonlinear factors through a feed-forward neural network layer to enhance the expression ability of the model. Specifically, as shown in FIG. 4, the output of the MHSA layer is dimensioned up through a fully connected layer. In this high-dimensional space, a Relu activation function layer is introduced to carry out a nonlinear operation, and an acquired result is projected into the subspace of the same dimension as the original. Similarly, in order to enhance the generalization ability of the network, residual connection and layer normalization are introduced at the end of the layer.

S2.2.3 The output of the transformer block is subjected to GAP in the satellite dimension so as to prepare for the next step of feature fusion. So far, the concerned environment environmental correlation feature is denoted as $MHD \in \mathbb{R}^{l_2}$, $l_2$ being a dimension of the fully connected layer in the block.

S2.3 By the fully connected network, the time series feature and the environmental characterization are fused to acquire a multipath signal identification result.

Through the above operations, the time series feature HID of the target satellite and the correlation feature MHD in the current environment are extracted. The two types of features are fused, and a final multipath signal identification result is output through the fully connected network. The specific operation process is as follows.

S2.3.1 The time series feature of the target satellite and the environmental correlation feature are fused by simply merging. HID and MHD are merged in respective last dimension, so the fused feature includes both temporal information and environmental information. The fused feature is $HMD \in \mathbb{R}^l$, $l=l_1+l_2$.

S2.3.2 The fused feature HMD is input into the fully connected network with A hidden layers. The time series information and environment information are deeply fused through multiple spatial projections, thus mining more features that are conducive to identifying the current satellite multipath signal.

S2.3.3 After the processing at the fully connected layer, the multipath signal is identified through these high-resolution high-dimensional features. In the present disclosure, the task is a binary logical regression classification task. Thus, it needs to be processed by a sigmoid activation function before classification output, so as to output a confidence for an identification result of the current satellite multipath signal.

In a preferred embodiment of the present disclosure, the method further includes the following step.

The multipath signal identification model is trained.

Figure 5:
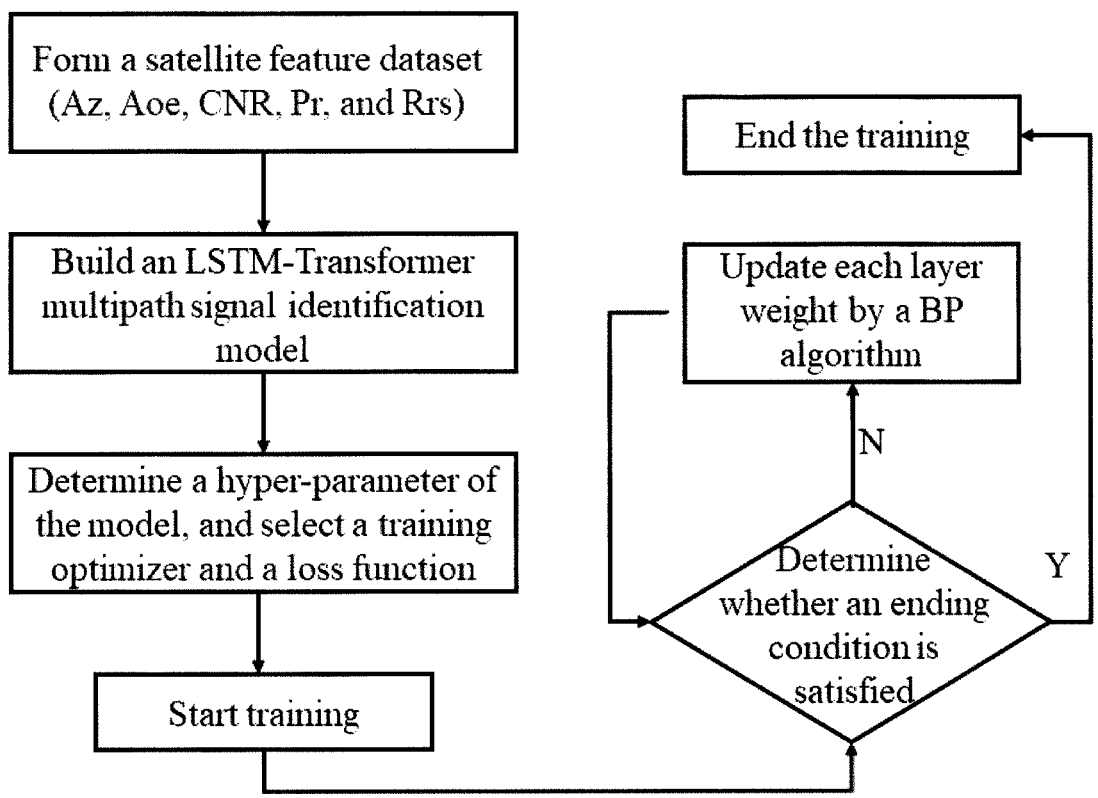
FIG. 5 is a flowchart of training a multipath signal identification model according to a specific embodiment of the present disclosure.

Based on the dataset built in step 1 and the model built in step 2, a gradient descent algorithm is used for training. The overall training process is shown in FIG. 5.

The input and output forms of this model are defined. The purpose of the present disclosure is to improve the multipath signal identification accuracy of the target satellite based on the temporality and spatial interaction of the satellite, so the output label of the model can indicate whether the signal received by the target satellite is a multipath signal. If the received signal of the target satellite is a multipath signal, the output label is 1, otherwise it is 0. The input of the model is the two forms of data mentioned in step 1, and a set of data can be expressed as:

$$\text{Inputs} = [MOA, MOB]$$

According to the constructed LSTM-transformer multipath signal identification model, the following hyper-parameters of the network layer need to be determined: 1) the number $l_1$ of neurons in the hidden layer of the LSTM network; 2) the length $l_2$ of the feature vector in the transformer block and the number h of heads of the MHSA block; and 3) the number $\lambda$ of layers of the fully connected network after fusion and the number of neurons in the hidden layer of the fully connected network.

In terms of the optimizer, an Adam optimizer with an adaptive learning rate is selected. It dynamically adjusts the learning rate of each parameter by the first-order time estimation and the second-order time estimation of the gradient. The main advantage is that after bias correction, the learning rate of each iteration has a certain range, making the parameters more stable.

In the present disclosure, the task is a binary logical regression classification task, and the loss function used is a binary cross-entropy loss function, which determines the quality of the multipath signal identification result. The calculation equation is as follows:

$$\mathcal{L}_{loss} = -\frac{1}{N}\sum_{i=1}^{N}(y_i \log(p_i) + (1-y_i)\log(1-p_i))$$

y denotes the binary label, 0 or 1; and p denotes a probability that the output is the y label. A prediction result of p closer to 1 indicates a value of the loss function closer to 0. The binary cross-entropy loss reflects the performance of the model to some extent.

The total number of epochs of model training is M. In the training process, the gradient is calculated by a back-propagation (BP) algorithm, so as to update the weight and bias of the model. The update equation is as follows:

$$w^{k+1} \leftarrow w^k - \alpha \nabla \mathcal{L}(w)$$

$$b^{k+1} \leftarrow b^k - \alpha \nabla \mathcal{L}(b)$$

w denotes the weight, b denotes the bias, and α denotes the learning rate.

Based on the above steps, the model is trained through the multipath signal label. When the iterations reach the maximum number of epochs, the training process is completed to acquire a trained multipath signal identification model, and the model is saved. After multiple test sets are tested and a satisfactory result is achieved, the model can be used with a positioning chip.

A storage medium is configured to store an instruction executable by a processor, where the instruction executable by the processor is executed by the processor to implement the above-mentioned satellite multipath signal identification method based on temporality and spatial interaction.

The content in the embodiment of the method is applicable to the embodiment of the storage medium. The specific function of the embodiment of the storage medium is the same as that of the embodiment of the method, and the beneficial effect of the embodiment of the storage medium is the same as that of the embodiment of the method.

The above merely describes specific embodiments of the present disclosure, but the present disclosure is not limited thereto. A person skilled in the art can make modifications or replacements without departing from the spirit of the present disclosure, and these modifications or replacements shall fall within the protection scope of the claims of the present disclosure.

What is claimed is:

1. A satellite multipath signal identification method based on temporality and spatial interaction, comprising the following steps:
   acquiring satellite data, and dividing the satellite data into a time series dataset and a multi-satellite input dataset;
   building a multipath signal identification model, and inputting the time series dataset and the multi-satellite input dataset into the multipath signal identification model;
   wherein, the multipath signal identification model comprises a long short-term memory (LSTM) network, a transformer block, and a fully connected network;
   performing, by the LSTM network, feature extraction on the time series dataset to acquire a time series feature;
   performing, by the transformer block, feature extraction on the multi-satellite input dataset to acquire an environmental characterization; and
   fusing, by the fully connected network, the time series feature and the environmental characterization to acquire a multipath signal identification result;
   wherein the performing, by the LSTM network, feature extraction on the time series dataset to acquire a time series feature specifically comprises:
   inputting the time series dataset into the LSTM network;
   removing, by a forget gate, invalid information at a historical time in the time series dataset to acquire a valid time series feature of a satellite;
   updating, by an input gate, the valid time series feature of the satellite to acquire processed state information;
   encoding, by an output gate, the processed state information to acquire a fixed time series; and
   cyclically updating, according to a length of the time series, the time series to acquire the time series feature.

2. The satellite multipath signal identification method based on temporality and spatial interaction according to claim 1, wherein the acquiring satellite data, and dividing the satellite data into a time series dataset and a multi-satellite input dataset specifically comprises:
   acquiring the satellite data;
   standardizing the satellite data to acquire standardized data;
   temporally processing, according to a time step, the standardized data to acquire the time series dataset; and
   filling and truncating, according to a preset threshold, the standardized data to acquire the multi-satellite input dataset.

3. The satellite multipath signal identification method based on temporality and spatial interaction according to claim 1, wherein the performing, by the transformer block, feature extraction on the multi-satellite input dataset to acquire an environmental characterization specifically comprises:
   inputting the multi-satellite input dataset into the transformer block;
   processing, according to a multi-satellite feature relationship, the multi-satellite input dataset to acquire a multi-satellite interaction feature; and
   subjecting the multi-satellite interaction feature to global average pooling (GAP) to acquire the environmental characterization.

4. The satellite multipath signal identification method based on temporality and spatial interaction according to claim 1, wherein the fusing, by the fully connected network, the time series feature and the environmental characterization to acquire a multipath signal identification result specifically comprises:
   inputting the time series feature and the environmental characterization into a fully connected layer;
   merging the time series feature and the environmental characterization in respective last dimension to acquire a fused feature;
   subjecting the fused feature to deep fusion through space projection to acquire a deep feature; and
   acquiring the multipath signal identification result based on the deep feature.

5. The satellite multipath signal identification method based on temporality and spatial interaction according to claim 1, wherein the building a multipath signal identification model, and inputting the time series dataset and the multi-satellite input dataset into the multipath signal identification model further comprises:
  training the multipath signal identification model.

6. The satellite multipath signal identification method based on temporality and spatial interaction according to claim 3, further comprising:
  subjecting the multi-satellite interaction feature to residual connection and layer normalization.

7. The satellite multipath signal identification method based on temporality and spatial interaction according to claim 5, wherein the training the multipath signal identification model specifically comprises:
  acquiring training data;
  determining a hyper-parameter in the multipath signal identification model, and setting an adaptive time estimation (Adam) optimizer, a binary cross-entropy loss function, and a total number of training epochs; and
  training, based on the training data, the multipath signal identification model to acquire a trained multipath signal identification model.

* * * * *